April 6, 1926. 1,579,643
J. E. CALVERLEY ET AL
COMMUTATING GEAR OF HIGH TENSION DIRECT CURRENT APPARATUS
Filed June 15, 1925    3 Sheets-Sheet 1
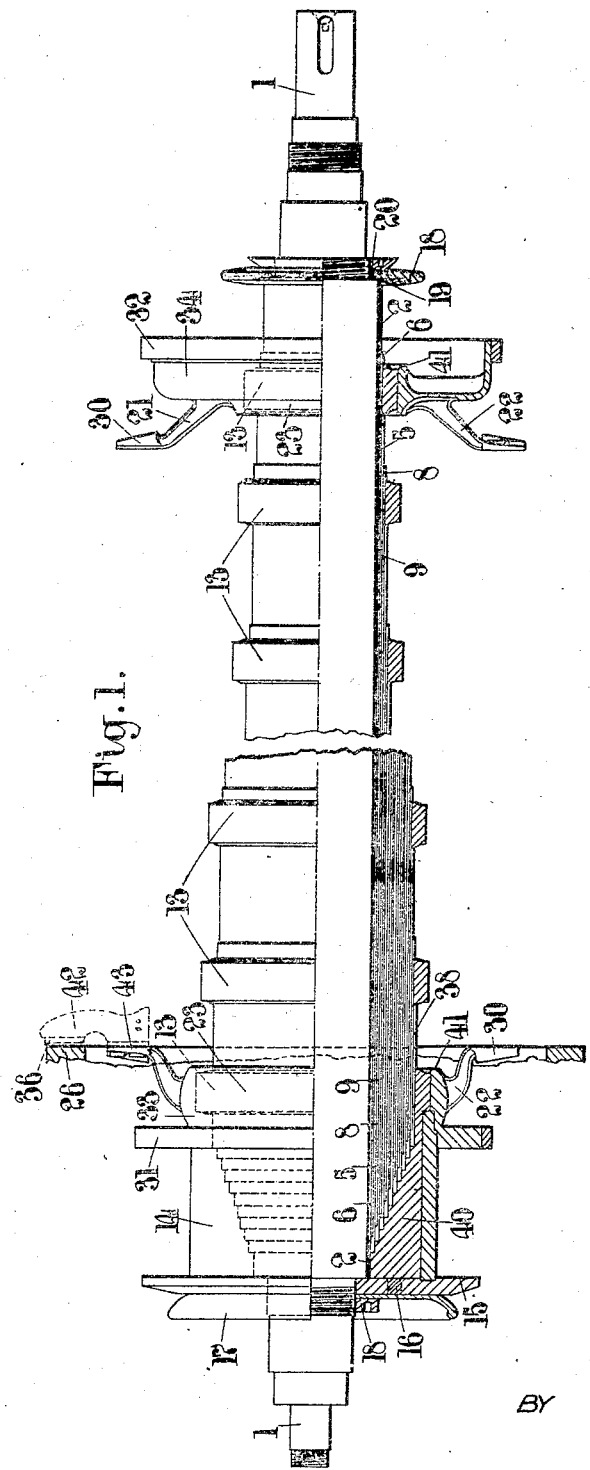

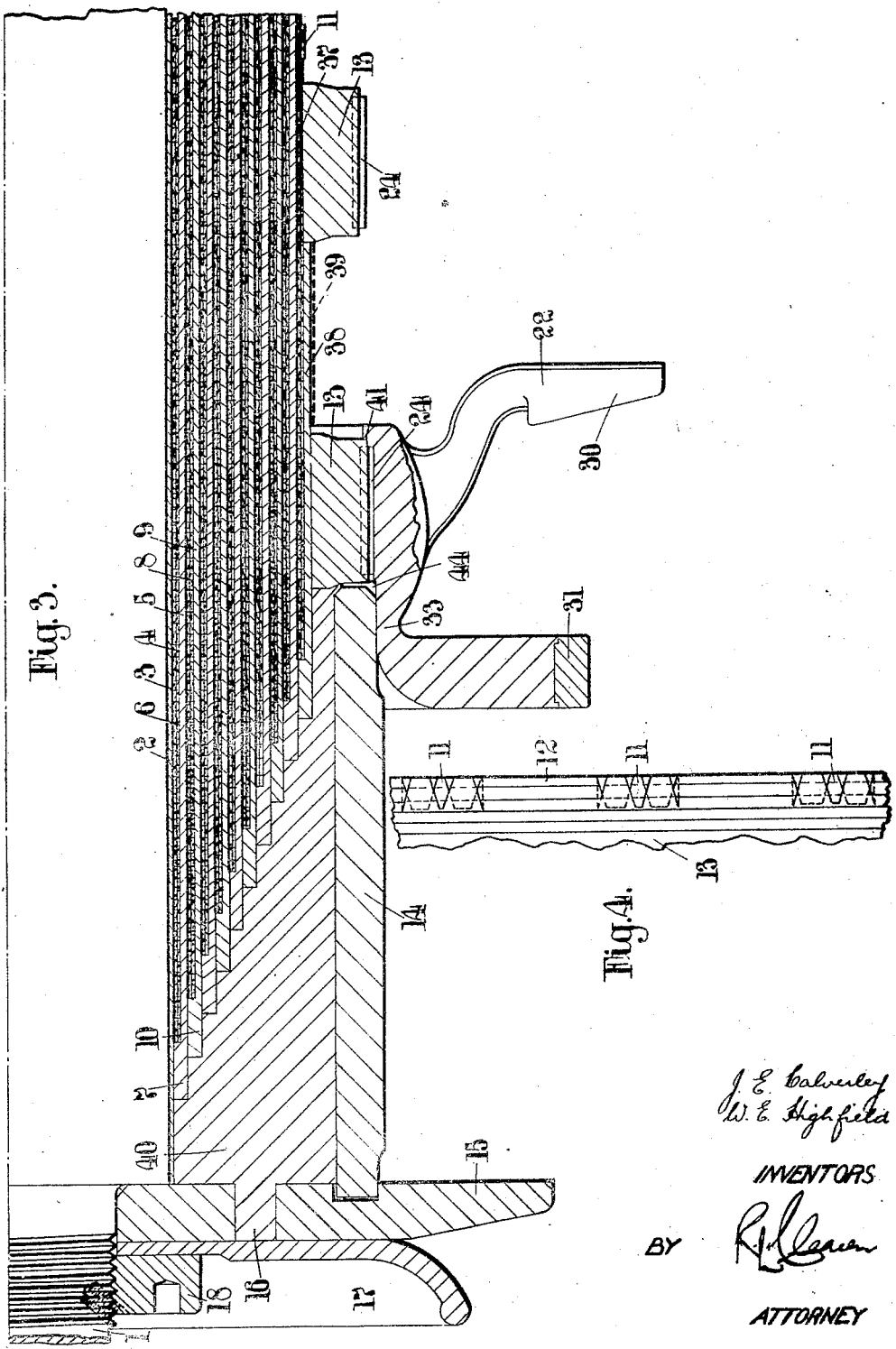

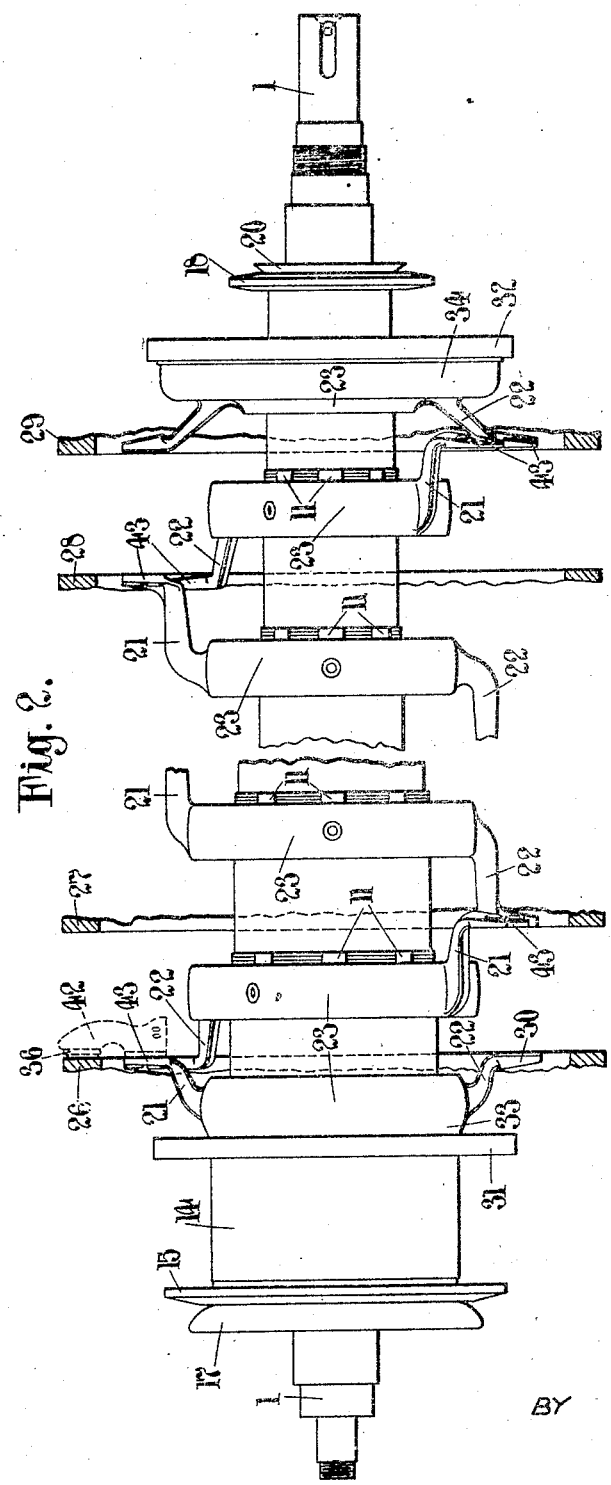

Patented Apr. 6, 1926.

1,579,643

UNITED STATES PATENT OFFICE.

JOHN EARNSHAW CALVERLEY, OF PRESTON, AND WILLIAM EDEN HIGHFIELD, OF LONDON, ENGLAND, ASSIGNORS TO THE ENGLISH ELECTRIC COMPANY LIMITED, OF LONDON, ENGLAND, A BRITISH COMPANY.

COMMUTATING GEAR OF HIGH-TENSION DIRECT-CURRENT APPARATUS.

Application filed June 15, 1925. Serial No. 37,222.

*To all whom it may concern:*

Be it known that we, JOHN EARNSHAW CALVERLEY, a subject of the King of England, residing at Preston, Lancashire, England, and WILLIAM EDEN HIGHFIELD, a subject of the King of England, residing at London, England, have invented certain new and useful Improvements in the Commutating Gears of High-Tension Direct-Current Apparatus, of which the following is a specification.

This invention relates to electrical machines in which the production or utilization of high tension direct current takes place by means of a number of commutators which are connected in series through their brush gear, the commutators being arranged about a common axis and in general located comparatively close together. In particular the invention deals with the insulation and mounting of the brush gear for these commutators.

The invention is primarily applicable to the apparatus now becoming known under the name "transverter" by which conversion is made between alternating and direct current or between direct current of one voltage and direct current of another voltage. Apparatus of this kind is described in the specifications of British Patent No. 140,853, United States patent application No. 369,001, Patent No. 1,366,057, and British Patent No. 216,690.

The series connection of the commutators by way of the brush gear provides that the potential difference between the brush carriers of adjacent commutators is generally that produced by one commutator and as this potential is generally the same for all the commutators, the potential of the brush gear increases in steps (generally equal) through the whole series.

As all the brush gear requires to be supported mechanically in a substantial manner, there is generally a comparatively small distance between the high potential parts of the gear and some supporting part at a materially different potential so that difficulties due to the maintenance of insulation or the production of corona effect may exist. By the present invention insulation of the condenser type is provided with the object of keeping as uniform as possible the potential gradient from the different members of the brush gear to the supporting part which is frequently earthed. This insulation is formed of a number of alternate layers of insulating material, such as mica or micanite, and metal in close contact with each other. The number of layers of metal may be equal to the number of sets of brush gear and each set may be in direct conductive connection with a layer so that the difference in potential between layers is maintained equal to the difference of potential across a commutator. Where the brush carriers are arranged in line so as to be mounted on a single shaft by which in the case of a transverter as at present constructed they are rotated, the layers are cylindrical and the general form of the insulation is similar to that of a condenser type bushing as used in high tension apparatus, for instance, for the terminals of transformers.

The invention will now be described by way of example with reference to the accompanying partly diagrammatic drawings of which Fig. 1 shows end portions, in half section, of a shaft with insulation and shrink rings; Fig. 2 shows the shaft fitted with brush arms or carriers, but with the central portion omitted; Fig. 3 shows on a larger scale a portion of Fig 1; Fig. 4 shows in a developed view a detail of construction.

In the method which is illustrated of carrying out the arrangement the shaft 1 is covered with a layer of micanite or mica 2 built up to form a tube enclosing the whole length of the part of shaft 1 on which the brush gear is to be carried, and extending a suitable distance beyond this length at each end. On the outside of this a metallic layer 6 is placed, preferably in the form of copper foil 3, enclosed in a thin metallic cylinder 4, for instance, of steel shrunk on or of wire wound on under tension in a manner similar to that used in connection with barrels of guns. The insulating layer 2 within metallic layer 6 extends an appropriate distance beyond that layer at each end. On the outside of metallic layer 6 is placed another layer 5 of insulation somewhat shorter axially than metallic layer 6, at the low tension end, but extending slightly beyond and covering the end of metallic layer 6 by an internal bushing or ring 7 at the high tension end. Layer 5 is then covered with a similar metallic layer 8 slightly shorter than layer 5 at both ends. On the outside of metallic layer 8 is placed another layer 9 of insulation somewhat shorter axially than metallic layer 8 at the low tension end, but extending slightly beyond and covering the end of metallic layer 8 by an internal bushing or ring 10 at the high tension end. This process is repeated until the appropriate number of layers is provided, the outermost layer being one of insulation. Usually as each layer is built up it will be tested for the efficiency of the insulation. Generally each succeeding layer of insulation from layer 2 outwards will be shorter than the preceding one at the high tension end as well as at the low tension end so as to form a stepped appearance at the high tension end.

Pressure is utilized in applying or consolidating each layer of insulation so that the production of air space between adjacent surfaces may be avoided. Care is exercised when wire is used in the metallic layers as is the case in the accompanying drawings that adjacent turns bear up tight against each other and a constant pull of suitable value, for instance 1800 lbs. should be exerted whilst winding the wire, which may be tinned and the adjacent turns may be soldered together. The wire which is of rectangular cross section with slightly rounded corners is wound in a double layer as shown in Fig. 3. Generally the end turns of the wire will be secured by clips 11 of which there may be as many as eight at one termination of the wire. Referring more particularly to Fig. 4 clips 11 pass under the last three turns of wire, of which 12 is the last turn, and their ends are turned over the outside of the wire and soldered in position.

With the method indicated there is produced a bushing around shaft 1 having a series of uncovered ends of the metallic layers, of which 6 and 8 are the two innermost ones, spaced apart by the end portions of the adjacent insulating layers, as at 5 and 9 Fig. 1. Onto these metallic projecting parts may be mounted, by shrinkage or clamping, rings 13 which carry the brush holders so that the potential of each metallic layer is fixed. In the present case rings 13 are shrunk on and a thin steel band 37 is arranged underneath each ring between it and the metallic layer. Usually the turning of the rings will be finished when they are shrunk in position. For the purposes of shrinking on, the rings will be raised to a temperature of about 700° F. It will be noticed that rings 13 are just clear of clips 11 and on the sides remote from the clips are in contact with the adjacent layer of insulation. The endmost ring at the high pressure end is shrunk directly onto the outside layer of insulation 38. Between the several rings 13 occur layers of insulation such as 38 which for a part of their length are not covered by a metallic layer or by a ring and these portions are covered by layers 39 of tape. The tape is wound tightly, stitched, and well treated with insulating varnish to give a smooth surface.

The stepped ends of the layers of insulation at the high tension end are enclosed in a strong insulating hollow cylinder 14 of a material such as bakelized paper and a lid 15 of similar material. The enclosed space is filled, after being well cleaned, with insulating compound 40, excess of which extrudes through holes such as 16 as lid 15 is forced on. Thickness of asbestos 44 helps to make the joint tight for pouring in the compound. One end of cylinder 14 abuts against endmost ring 13 and passes under a web supporting a slip ring to be referred to hereinafter, and is kept in position together with lid 15 by plate 17 secured by nut 18 on shaft 1.

The extremity of insulating layer 2 at the low tension end may be protected by a ring 18 of bakelite or the like material. A flange 19 on the ring which is secured by nut 20 covers the face of the layer for a short distance along shaft 1.

It is possible that in some cases the bushing may be made symmetrical about a centre plane, the two sets of commutators on each side of this plane being connected in parallel so that the potential rises from the two ends of the shaft symmetrically to the centre. In such a case both ends of the bushing will generally be similar to the low tension end already described.

The carriers or rings 23 are rigidly secured to rings 13. This may be accomplished by heating them to a maximum temperature of 212° F. and sliding them onto the said rings, and by using keys 24 which help to secure rings 23 and to position them as also do shoulders 41. Each carrier 23 is formed with two arms 21, 22 spaced 180° apart, and since commutators 26, 27, 28, 29 are in the present instance six pole commutators, the arms of brush holders serving one and the same commutator are arranged sixty geometrical degrees apart around shaft 1. There are ten commutators in all, and eleven rings 13 with their corresponding brush gear, but for clearness only the commutators 26 and 27 at the high tension end and the commutators 28 and 29 at the low tension end with the corresponding brush arms are shown in Fig. 2, and the parts of the shaft and brush gear of Fig. 1 correspond to those portions illustrated in Fig. 2. It will be understood that the commutators which are not shown and the corresponding brush gear, are arranged in a manner similar to that illustrated in the drawings for commutators 26, 27, 28, 29. The commutators which may be of any suitable form are preferably of the disc type, and may be of the kind described in British patent specification No. 214,698. As shown in the drawings pairs of them are arranged face to face.

The endmost rings 23 require only one arm 21 or 22 to carry a brush holder, and the idle arm 22 or 21 is in each case formed with a balance weight 30. The endmost rings 23 of the high and low tension ends are also arranged with slip rings 31 and 32 respectively, conductively held by and joined to rings 23 by webs 33 and 34.

For the sake of simplicity only a single brush-holder 42 is shown in the drawings, and is seen on arm 21 at the high tension end of shaft 1. The brush-holder 42 which carries brush 36 bearing on commutator 26 is bolted or otherwise rigidly secured to a seating 43, with which each arm is formed, on the end of the said arm 21.

The brush gear on adjacent commutators as has been described may be put directly in series by carrying the positive brush gear of one commutator on an arm extending from the same ring as the arm which carries the negative brushes of the adjacent commutator. Alternatively the two sets of arms may be carried on two rings which are mounted on the same metallic layer.

Advantage of the existence of definite potentials between those of the terminals may be taken in some cases by bringing out through the sealing of the high tension end wires connected with the appropriate metallic layers. Such intermediate voltages are useful in many cases for testing purposes where only a small fraction of the power output is required. Another use of such connections would be for attachment to a voltmeter for the purpose of indicating the potential of the whole apparatus by measuring a definite proportion thereof, for instance, the voltage produced by one commutator.

As previously suggested herein it is not essential that the number of metallic layers should correspond to the number of sets of brush gear. It may, for instance, be convenient to make the voltage difference between layers less than the voltage between adjacent sets of brush gear and for this purpose the number of metallic layers may be made twice the number of commutators, the layers which come between those connected to brush gear being designed with the correct capacity for attaining the appropriate intermediate value of potential.

When the brush gear is in operation current flows from slip ring 32 supported by the endmost carrier 23 at the low tension end, through the negative brushes held by arm 22, the corresponding commutator 29, windings associated with that commutator, positive brushes corresponding to commutator 29, and through arm 21 carrying these brushes, and forming part of the second carrier 23 from the low tension end. From the said arm 21 the current flows to the opposite arm 22 through that arm, the negative brushes held by it, the corresponding commutator 28, windings associated with that commutator, positive brushes corresponding to commutator 28, and through arm 21 carrying those brushes and forming part of the third carrier 23 from the low tension end. In a similar manner the current flows through the remaining eight commutators and the voltage of these commutators is added to that of commutators 29 and 28. Current therefore flows through brushes 36, brush-holder 42, arm 21 forming part of the endmost carrier at the high tension end, slip ring 31, and thence through the external circuit back to slip ring 32.

It is seen that in the arrangement of brush gear and commutators shown in the drawings the disposition of the metallic and insulating layers round the central shaft and the mounting of the carriers not only ensures a sufficiently gradual potential gradient and efficient insulation between the carriers and the shaft, but it also ensures that the potential of parts inside and adjacent to any commutator shall not greatly differ from the potential of the commutator and any tendency for corona discharge to form on commutator bars or on brush gear is diminished.

What we claim as our invention and desire to secure by Letters Patent is:—

1. Commutating gear for use with a plurality of co-axial commutators adapted for connection in series through their brush gear, comprising a plurality of brush carriers, a supporting member for said carriers, insulating means between said carriers and said member for insulating the carriers from each other and from the said member, said means comprising alternate layers of insulating material and conducting material forming an arrangement of the condenser type.

2. Commutating gear for use with a plurality of co-axial commutators adapted for connection in series through their brush gear, comprising a plurality of brush carriers, a supporting member for said carriers, insulating means between said carriers and said member for insulating the carriers from each other and from the said member, said means comprising alternate layers of insulating material and conducting material forming an arrangement of the condenser type, and means for establishing definite potential relationships between conducting layers.

3. Commutating gear for use with a plurality of co-axial commutators adapted for connection in series through their brush gear, comprising a plurality of brush carriers, a supporting member for said carriers, insulating means between said carriers and said member for insulating the carriers from each other and from the said member, said means comprising alternate layers of insulating material and conducting material forming an arrangement of the condenser type, and electrical conductive connections between some of the conducting layers and the brush carriers.

4. An insulating arrangement of the condenser type for the brush carriers of a plurality of co-axial commutators adapted to be put in series through their brush gear and disposed in line with a shaft passing freely through them and supporting the brush carriers, comprising concentric tubes formed alternately of insulating material and conducting material enclosing that part of the shaft which lies within and adjacent to the commutators.

5. A brush carrying arrangement for use in conjunction with a plurality of co-axial commutators adapted to be put in series through their brush gear and disposed in line, comprising a shaft passing freely through the commutators, a plurality of alternate layers of insulating and conducting material surrounding that part of the shaft within and adjacent to the commutators, brush carriers each surrounding some of said layers and means for connecting the carriers conductively with layers of conducting material the connection being effected so that the potential of the layers rises from the inside to the outside.

6. A brush carrying arrangement for use in conjunction with a plurality of co-axial commutators adapted to be put in series through their brush gear and disposed in line, comprising a shaft passing freely through the commutators, a plurality of insulating and a plurality of conducting tubular layers arranged alternately and mounted on the shaft, said layers decreasing in length progressively from the inside layers to the outside layers whereby exposed end portions of the conducting layers are produced, brush carrier rings mounted on some of these exposed end portions and electrically connected therewith.

7. A brush carrying arrangement for use in conjunction with a plurality of co-axial commutators adapted to be put in series through their brush gear and disposed in line, comprising a shaft passing freely through the commutators, a plurality of insulating and a plurality of conducting tubular layers arranged alternately and mounted on the shaft, said layers decreasing in length progressively from the inside layers to the outside layers whereby exposed end portions of the conducting layers are produced, brush carrier rings mounted on some of these exposed end portions and electrically connected therewith, the said rings being so disposed that when in operation the potential of the ring near one end of the shaft is of a relatively low value and the potentials of the other rings increase progressively as they proceed away from that end.

8. A brush carrying arrangement for use in conjunction with a plurality of co-axial commutators adapted to be put in series through their brush gear and disposed in line, comprising a shaft passing freely through the commutators, a plurality of insulating and a plurality of conducting tubular layers arranged alternately and mounted on the shaft, said layers decreasing in length progressively from the inside layers to the outside layers whereby exposed end portions of the conducting layers are produced, brush carrier rings mounted on some of these exposed end portions and electrically connected therewith, the said rings being so disposed that when in operation the potential of the ring near one end of the shaft is of a relatively low value and the potentials of the other rings increase progressively as they proceed away from that end, and means for enclosing and sealing the end portions of the layers at the end remote from the low potential ring.

9. A brush carrying arrangement for use in conjunction with a plurality of co-axial commutators adapted to be put in series through their brush gear and disposed in line, comprising a shaft passing freely through the commutators, a plurality of alternate layers of insulating and conducting material surrounding that part of the shaft within and adjacent to the commutators, brush carriers each surrounding some of said layers and each having two electrically connected arms disposed so as to cooperate with adjacent commutators and put them in series, and means for connecting the carriers conductively with layers of conducting material the connection being effected so that the potential of the layers rises from the inside to the outside.

10. Commutating gear for use with a plurality of co-axial commutators adapted for connection in series through their brush gear, comprising a plurality of brush carriers, a supporting member for said carriers, insulating means between said carriers and said member for insulating the carriers from each other and from the said member, said means comprising alternate layers of insulating material and conducting material forming an arrangement of the condenser type, the conducting layers being formed of metal foil bound with wire.

In testimony whereof we affix our signatures.

JOHN EARNSHAW CALVERLEY.
WILLIAM EDEN HIGHFIELD.